July 20, 1965  
I. JEPSON ETAL  
3,196,253  
ELECTRICALLY HEATED COOKING VESSEL  
Filed Jan. 15, 1962  
2 Sheets-Sheet 1
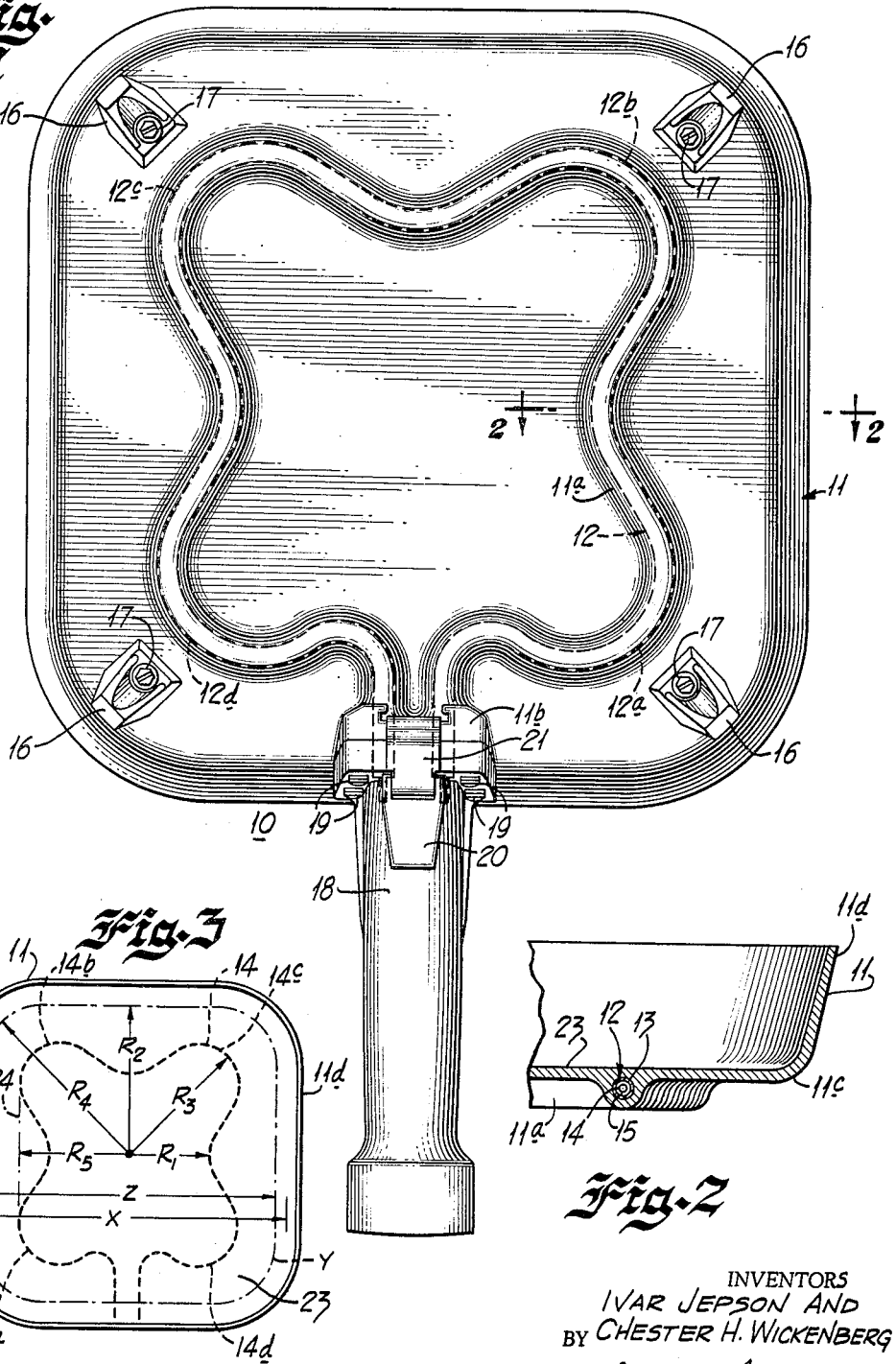
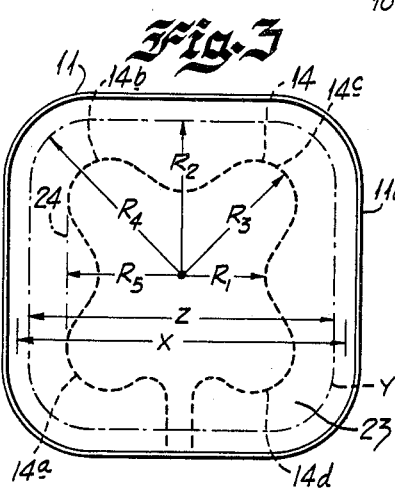
INVENTORS  
IVAR JEPSON AND  
BY CHESTER H. WICKENBERG  
George R. Clark  
ATTORNEY July 20, 1965

I. JEPSON ETAL 3,196,253

ELECTRICALLY HEATED COOKING VESSEL

Filed Jan. 15, 1962

INVENTORS
IVAR JEPSON AND
BY CHESTER H. WICKENBERG

George R. Clark
ATTORNEY

United States Patent Office 3,196,253
Patented July 20, 1965

3,196,253
ELECTRICALLY HEATED COOKING VESSEL
Ivar Jepson, Oak Park, and Chester H. Wickenberg, Elgin, Ill., assignors to Sunbeam Corporation, Chicago, Ill., a corporation of Illinois
Filed Jan. 15, 1962, Ser. No. 166,289
3 Claims. (Cl. 219—436)

The present invention relates to cooking vessels and, more particularly, to self-contained electrically heated temperature controlled cooking vessels which are completely immersible in liquid for cleaning purposes. Specifically, the present invention is a continuation-in-part of copending Jepson and Wickenberg application Serial No. 739,876, filed June 4, 1958, now Patent No. 3,068,342, and assigned to the same assignee as the instant application.

Electrically heated self-contained temperature controlled cooking vessels have been extensively sold ever since the development of the cooking vessel disclosed and claimed in Jepson Patent No. 2,744,995, granted May 8, 1956, and assigned to the same assignee as the instant application. A cooking vessel substantially like that disclosed in the above-mentioned Jepson patent was introduced to the trade in 1953 and was immediately a great commercial success. One of the principal reasons for the immediate success of the cooking vessel of the prior Jepson patent was the fact that the vessel was immersible for cleaning purposes. It was, in fact, the first electrically heated automatically controlled cooking vessel which could be immersed in liquid for cleaning purposes. Since the introduction of that first electrically heated automatically controlled cooking vessel many others have come on the market. In fact, it is safe to say that the accepted way of cooking today is by means of self-contained automatically controlled cooking vessels rather than the old-fashioned way of heating vessels of some sort on the kitchen range.

The self-contained cooking units with control means for automatically controlling the temperature generally comprise a vessel with the bottom of which is associated an electric heating element usually of the sheathed type. The vessel is conventionally manufactured at least in part of a good heat conducting material of light weight such as aluminum so that the heat from the heating element is relatively uniformly distributed over the bottom of the vessel which defines the cooking surface on the opposite side thereof. The vessel may be formed as a casting, in which case the sheathed heating element is embedded in a rib integrally cast with the vessel. On the other hand, the vessel may be formed as a metal stamping, in which case the sheathed heating element is brazed or otherwise secured in good heat transfer relationship with the bottom of the vessel. The vessel may have the interior surface thereof formed of stainless steel, but the bottom exterior would be formed of a good heat conducting or heat spreading material, which might be formed as a casting or a stamping. The heating element would be secured to the heat spreading material in one of the manners referred to above.

For the purpose of controlling the temperature, suitable temperature sensing or temperature responsive means would be included. Various types of temperature responsive control means are available and are generally selectively adjustable to produce controlled temperatures from a low warming temperature up to high heat temperatures. Where the temperature control means is built into the vessel or the handle thereof, the temperature sensing element will, of course, be in intimate heat exchange relationship with the vessel at all times. In other cooking vessels of the self-contained type the temperature control means may be separable from the vessel itself so that during the washing operation it is unnecessary to immerse the portion of the vessel which contains the temperature control means, since the latter is physically removed from the vessel. Such a device either requires a removable temperature sensing probe or the like which is associated in good heat conducting relationship with the bottom of the vessel, as is disclosed, for example, in the parent application of which this is a continuation-in-part, or the temperature sensing element might be physically embodied in the vessel portion but the control means for controlling the heating could be physically removed from the vessel as is disclosed, for example, in copending Koci et al. application Serial No. 590,694, filed June 11, 1956, now Patent No. 3,098,918, and also assigned to the same assignee as the instant application.

It is important that in electrically controlled self-contained cooking vessels a uniform distribution of heat occurs over the entire cooking surface so that the housewife may set the device and forget it. If this were not the case, hot spots might cause burning of the food in certain places, and the ultimate aim of course is that such cooking vessels have substantially uniform temperatures throughout the area of the bottom thereof. Obviously, if a heating element were uniformly distributed over the entire bottom area of the cooking vessel, then a relatively uniform temperature would be obtainable. It becomes rather difficult, however, to uniformly distribute a sheathed type heating element over the area of the cooking vessel, and, of course, a sheathed type element is considered essential to insure immersibility of the vessel under all conditions. Moreover, from an expense and manufacturing standpoint, it is almost essential to limit the sheathed heating element to a one-turn loop.

It would be desirable to provide a cooking vessel of the above-mentioned type wherein the sheathed heating element comprises essentially a one-turn loop and yet wherein, for cooking surfaces of different sizes, uniform heating throughout the area is obtained. It would, furthermore, be desirable to provide such a cooking vessel which is simple, compact, of sturdy construction, which is completely immersible in cleaning liquids of all sorts, and which will give uniform heating throughout the cooking surface. Such a cooking vessel should have a pleasing appearance so as not to detract from the beauty of the kitchen or other room in which the vessel is used, and so as to provide adequate accurate controlled heat at all times.

Accordingly, it is an object of the present invention to provide a new and improved self-contained electrically controlled cooking vessel.

It is another object of the present invention to provide an improved heating element construction for an electric cooking vessel which will insure uniform temperatures throughout the cooking surface with a one-turn loop sheathed heating element.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 1 is a bottom view of one embodiment of a cooking vessel embodying the heating element of the present invention;

FIG. 2 is a fragmentary sectional view taken on line 2—2 of FIG. 1;

FIG. 3 is a schematic top view of the cooking vessel of FIG. 1 with the center of the sheathed heating element being outlined by dashed lines to illustrate certain relationships of the heating element with respect to the cooking or heating surface of the cooking vessel;

Figure 4:
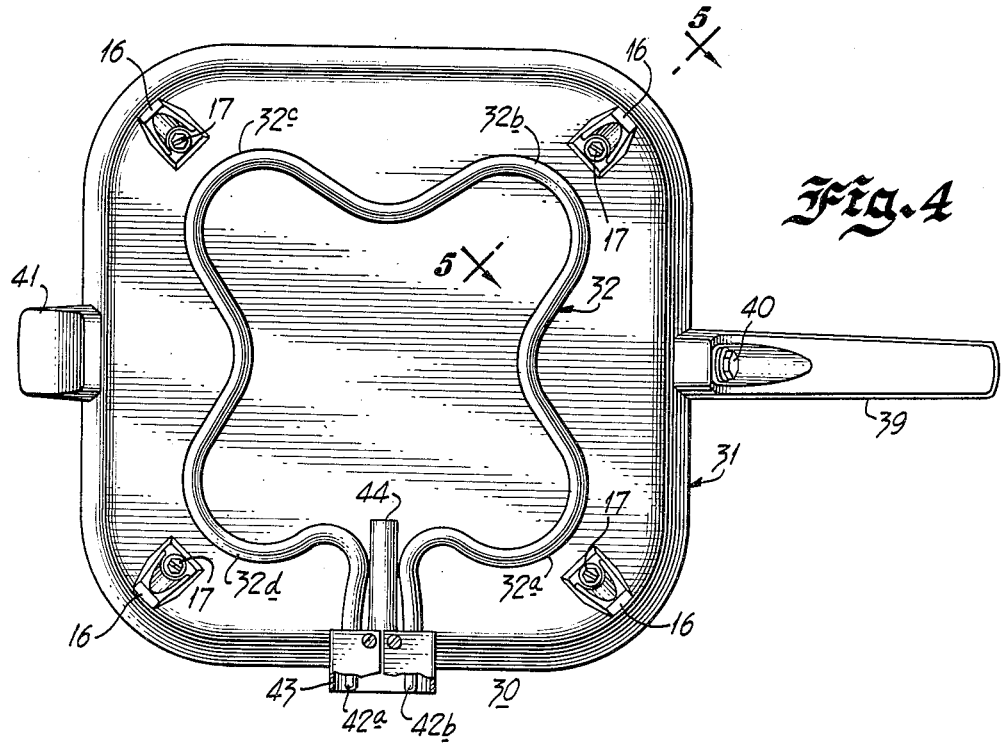
FIG. 4 is a bottom view similar to FIG. 1 of another cooking vessel embodying the present invention wherein the temperature sensing element is removable and not illustrated in the drawings.

Briefly, the present invention is concerned with electric cooking vessels of generally square configuration having a single-turn sheathed heating element for uniformly heating the cooking surface of such vessels in which the heating element has a plurality of lobes extending toward the corners of the cooking vessel and this configuration insures uniform temperatures throughout the cooking surface for all settings of the temperature control means for such vessel.

Referring now to FIGS. 1 to 3 of the drawings, there is illustrated a self-contained heating or cooking unit generally designated by the reference numeral 10, which includes a vessel portion 11 (hereinafter referred to as vessel), which may be formed of any suitable material and which may be manufactured in any suitable manner. As specifically illustrated in FIGS. 1 and 2 of the drawings, the vessel 11 is preferably an aluminum casting of generally square shape with rounded corners and having a relatively shallow depth so as to define what is commonly referred to as a frying pan. Although the present invention is particularly well adapted for square-shaped cooking vessels which have almost completely replaced the older circular cooking vessels, the particular size and depth of the vessel 11 forms no part of the present invention and is by way of example only. For example, the cooking vessel 11 might be a large or small saucepan, a griddle, a pressure cooker or the like, and the present invention will apply equally well regardless of the particular type of cooking vessel employed. It should also be understood that, although in the embodiment of FIGS. 1 and 2 the vessel 11 is illustrated as a casting, it might comprise a metal stamping such as is illustrated and described in the embodiment of FIGS. 4 and 5 of the drawings.

For the purpose of heating the vessel 11, there is associated with the bottom thereof an electric heating element in the form of a single turn loop, generally designated as 12 in FIGS. 1 and 2 of the drawings, which is preferably of the well-known sheathed type. Such sheathed heating elements, as best shown in FIG. 2 of the drawings, generally comprise an outer metal sheath 13 containing generally at the center thereof a resistance element 14, usually in somewhat coiled form. The space within the sheath 13 and between the turns of the coiled resistance element 14 is filled with a material which is a good electrical insulator but which, at the same time, is also a relatively good heat conductor. Such material has generally comprised a compacted magnesium oxide designated by the reference numeral 15 in FIG. 2 of the drawings. The center of the coiled resistance element 14 is schematically designated in FIG. 3 by a dashed line to which is appended the reference numeral 14. As illustrated in FIGS. 1 and 2 of the drawings, the single turn sheathed heating element 12 has a particular lobed configuration forming an important part of the present invention which will be described in detail hereinafter. However, this configuration in the form of a one-turn loop is cast into a raised integrally formed rib 11a of the cooking vessel 11. The configuration of the rib 11a is, of course, also lobed similar to that of the sheathed element 12, since it completely encloses the latter.

Figure 5:
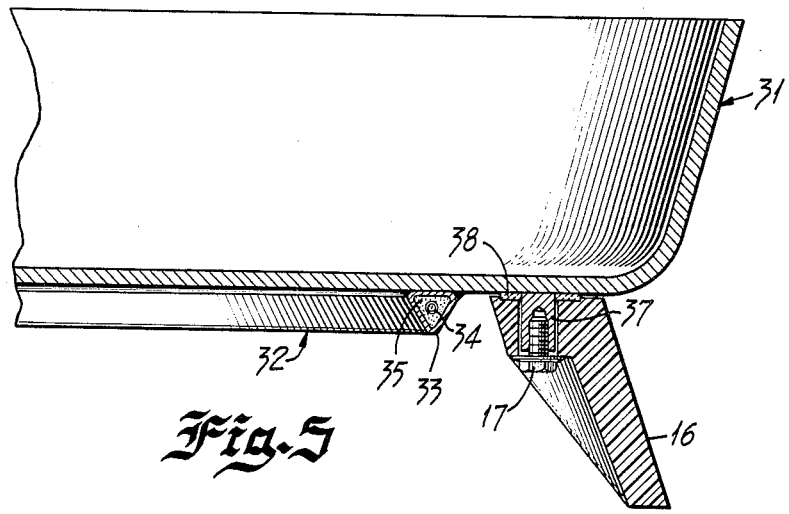
FIG. 5 is an enlarged fragmentary sectional view taken on line 5—5 of FIG. 4.

In order to support the cooking unit 10 from any suitable surface which might or might not be heat resistant, such as tables or other furniture, the vessel 11 is provided with a plurality of supporting legs 16, preferably formed from a suitable phenolic resin, such as Bakelite. These legs may be secured to the bottom of the vessel 11 in any suitable manner similar to that shown in the parent application of which this is a continuation-in-part. The vessel may be provided with suitable foot studs, not shown in FIGS. 1 and 2 but illustrated in FIG. 5 of the drawings, which may be cast integrally with the vessel 11. One foot stud would be provided adjacent each corner of the square vessel 11. Each foot stud is provided with a tapped opening for receiving a suitable screw 17 which may have a washer type head for firmly securing the associated leg 16 to the vessel. The foot studs will be designed to cooperate with suitable recesses in the legs 16 to prevent relative rotation of the legs 16 about the axes of the foot studs. If desired, for reducing heat transfer between the vessel 11 and the legs 16, there may be provided interposed washers such as shown in FIG. 5 of the drawings, formed of asbestos or similar material, which will space the legs 16 slightly from the bottom of the vessel.

In the embodiment shown in FIGS. 1 and 2 of the drawings, the temperature control means is built into the vessel or handle, and in this respect is similar to the above-mentioned Jepson Patent No. 2,744,995. As illustrated, the rib 11a merges with a housing portion 11b, also integrally cast with the vessel 11, to which is secured a hollow handle 18, preferably formed of the same material as the legs 16. The handle 18 is secured to the vessel 11, and specifically to the portion 11b thereof, by means of suitable fastening means 19. Preferably, suitable sealing means are interposed between adjacent portions of handle 18 and portion 11b to insure a completely sealed construction for immersion in liquid for cleaning purposes. Contained within the sealed chamber defined by the integral portion 11b and the hollow handle 18 are temperature responsive control means and switch contacts for selectively controlling the energy supplied to the sheathed heating element 12 and, consequently, for controlling the temperature of the cooking surface.

As illustrated in FIG. 1 of the drawings, the cooking vessel 11 is provided with the fifth leg 20 secured by a resilient spring element 21 to the portion 11b of the housing in a manner disclosed in a copending Wickenberg application Serial No. 15,323, filed March 16, 1960, and also assigned to the same assignee as the instant application. This arrangement permits the level of one side of the vessel to be raised to cause any liquid contained therein to move to the other side.

The cooking surface of the cooking vessel 11, designated by the reference numeral 23 in FIGS. 2 and 3 of the drawings, is a flat plane surface which is connected by a curved portion 11c with the side of the vessel 11d. This flat plane surface is defined by the line Y in FIG. 3 of the drawings. In commercial cooking vessels built in accordance with the present invention the radius of curvature of the curved portion 11c is of the order of one-half inch and the side portion 11d is not vertical but is disposed at an angle of the order of about fifteen degrees with the vertical. Obviously, the sides 11d of the vessel 11 may have any configuration. Cooking vessels, such as 11, are sold in various sizes. Sometimes they are designated as small, medium and large. Sometimes they have been designated as ten inch, eleven inch and twelve inch cooking vessels, and the like. In general, the flat cooking surface 23 is not ten inches square in a ten inch fry pan or eleven inches square in an eleven inch fry pan. Instead, the dimension is usually measured between the midpoints of the opposite side walls. Thus, as is indicated in FIG. 3 of the drawings, the dimension determining the size of the fry pan is commonly that designated by the distance X in FIG. 3 of the drawings, which is the distance between midpoints of opposite side walls 11d. The thickness of the bottom of cooking vessels defining the cooking surface 23 vary with different constructions, and might be from 0.100 of an inch to 0.160 of an inch, depending upon whether the stamped or cast construction is employed. In one commercial embodiment for the ten and eleven inch stamped construction, the cooking surface had a thickness of 0.1285 of an inch while for a cast construction a thickness of 0.156 of an inch was employed.

In accordance with the present invention, the single turn loop defined by the sheathed heating element 12 is provided with a particular configuration to give substantially uniform temperature at any point over the area of the cooking surface 23. This is accomplished by providing a configuration having a plurality of outwardly directed lobes designated in FIG. 2 of the drawings as lobes 12a, 12b, 12c and 12d, and correspondingly the lobes of the resistance element 14 are designated as 14a, 14b 14c and 14d in FIG. 3 of the drawings, which is a top view of the cooking vessel as distinguished from the bottom view of FIG. 1. The lobes of the heating element 12 or the resistance element 14 extend toward a respective one of the corners of the vessel and between the lobes are curved portions or inwardly directed lobes which interconnect the outwardly directed lobes in a smooth continuous curve. It will be apparent that due to the shape of the heating element 12, good heating at the corners of the vessels is provided. By virtue of the lobe construction, a greater length of heating element is available in a single turn loop which permits a lower heat density per unit length, which insures less likelihood of hot spots. In a device built in accordance with the present invention, which might be designated as a twelve inch cooking vessel, the side dimension of the flat or plane cooking surface 23, designated by the distance Z in FIG. 3 of the drawings, actually measured 10.66 inches which makes the area of this plane cooking surface 109.9 square inches. In this specific construction, the distance from the center of the fry pan to the closest point on the heating element is indicated in FIG. 3 of the drawings as $R_1$ while the distance to the most remote point is designated as $R_3$. The distance from the center of the pan to the edge of the cooking surface is designated as $R_2$, while the distance from the center of the pan to the corner of the flat cooking surface 23 is designated as $R_4$. The distance between the center of the pan and a straight line designated as 24 (FIG. 3) interconnecting the lobes is indicated as $R_5$.

It has been found that for uniform heating the ratio of $R_1/R_2$ should be between 0.50 and 0.60. Furthermore, the ratio of $R_3/R_4$ should be between 0.60 and 0.80. Also, the ratio of $R_5/R_2$ should be between 0.60 and 0.80. In commercial embodiments made in accordance with the present invention, the dimensions and ratios indicated by the following table were employed.

| | | | |
|---|---|---|---|
| X ------inches-- | 10.00 | 11.00 | 12.00 |
| Z ------do---- | 8.613 | 9.670 | 10.660 |
| $R_1$ ------do---- | 2.44 | 2.84 | 3.000 |
| $R_2$ ------do---- | 4.31 | 4.83 | 5.331 |
| $R_3$ ------do---- | 3.49 | 4.37 | 5.125 |
| $R_4$ ------do---- | 5.19 | 5.93 | 6.681 |
| $R_5$ ------do---- | 2.80 | 3.470 | 4.065 |
| $R_1/R_2$ | 0.566 | 0.588 | 0.563 |
| $R_3/R_4$ | 0.672 | 0.738 | 0.768 |
| $R_5/R_2$ | 0.65 | 0.719 | 0.762 |

Extensive testing of the cooking vessels built in accordance with the present invention have demonstrated that substantially uniform temperatures are obtained throughout the entire cooking surface with the single turn loop, which is not the case with prior art devices where circular, square or other type heating elements are employed.

In FIGS. 4 and 5 of the drawings, there is illustrated the same configuration of the heating element shown in FIGS. 1, 2 and 3 of the drawings, except that the cooking unit, generally designated by the reference numeral 30, has a stamped vessel 31 to which is brazed a sheathed heating element 32. This sheathed heating element is illustrated as having a generally triangular shaped sheath 33 within which there is centrally disposed the coiled resistance element 34 and the compacted material 35 which may be identical with that designated by the reference numeral 15 in FIGS. 1 and 2 of the drawings. This sheathed heating element 32 is provided with the lobes 32a, 32b, 32c and 32d, which preferably have the same configuration as described in FIGS. 1 and 3 of the drawings. The legs for the vessel 31 are designated by the reference numeral 16, as in the preceding embodiment and the fastening means 17 are also designated by the same reference numerals. The foot studs, of which one is shown in FIG. 5 of the drawings, is designated by the reference numeral 37, which is brazed or otherwise secured to the bottom of the stamped cooking vessel 31. The asbestos washer 38 between the leg 16 and the bottom of the vessel is clearly indicated in FIG. 5 of the drawings. The vessel 31 is provided with the conventional handle 39 so that the housewife may manipulate it during a cooking operation. The handle is secured to the vessel by any suitable means including a fastening screw 40 passing through a portion thereof, and preferably engaging a handle stud suitably brazed or otherwise secured to the vessel 31. In addition to that handle 39, a small handle member 41 may be secured to the opposite side of the vessel from the handle 39, particularly in the case of relatively large cooking vessels. It will be understood that this gives an additional means for supporting such a cooking vessel.

The sheathed heating element 32 is a single turn loop, as has been mentioned before, and the ends of the loop are brought out to the sides of the vessels, it being understood that the entire sheath is brazed to the vessel including the portions brought out to the sides of the vessels. Suitable terminals 42a and 42b are connected to the ends of the coiled resistance element 34 and these terminals project from the side of the vessel 31 and are adapted to be connected to a suitable terminal plug, as fully disclosed in the parent application of which this is a continuation-in-part. To protect the terminals 42a and 42b, a suitable terminal cover 43 is provided which defines an effective recepticle for the removable temperature control unit not shown. Such removable control units generally have an elongated probe which defines a temperature sensing element and to accommodate such a probe a tubular sleeve open at both ends, designated by the reference numeral 44, is brazed or otherwise secured to the vessel 31 between the ends of the heating element 32 which are brought out to the side of the vessel. The relationship of the lobes as set forth above is the same whether the heating element is cast into an integral part of the vessel or secured thereto as in FIG. 4 of the drawings.

In view of the detailed description included above, the operation of the present invention will readily be understood by those skilled in the art. Moreover, with the lobed heating element uniform heating for the square cooking vessel is obtained over the entire heating surface.

While there have been illustrated and described several embodiments of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. A cooking vessel comprising a plane heating surface of generally square configuration, an electric heating element in the form of a single turn loop secured in intimate heat exchange relationship with said surface, said loop comprising a plurality of outwardly directed curved lobes one extending toward each corner of said heating surface, adjacent ones of said outwardly directed lobes being interconnected by inwardly directed lobes, said loop being symmetrically disposed with respect to the center of said generally square plane heating surface, said heating element being of such configuration that the ratio of $R_1$ to $R_5$ is within the range of .738 to .871 and the ratio of $R_3$ to $R_4$ is within the range of 0.60 and 0.80, wherein $R_1$ designates the distance from the center of said square surface to the points on said inwardly directed lobes nearest the center, $R_5$ designates the distance from the center of said surface to a line interconnecting the extremities of two adjacent outwardly directed lobes, $R_3$ designates the distance from the center of said square surface to the points on said outwardly directed lobes most remote from the center, and $R_4$ designates the distance from the center to one corner of said cooking surface.

2. A cooking vessel comprising a plane heating surface generally in the shape of a square, an electric heating element in the form of a single turn loop secured in intimate heat exchange relationship with said surface, said loop comprising a plurality of outwardly directed rounded lobes one extending toward each corner of said cooking surface, adjacent ones of said outwardly directed lobes being interconnected by inwardly directed lobes, said single turn loop being symmetrically arranged with respect to the center of said plane heating surface, said heating element being of such configuration that the ratio of $R_1$ to $R_2$ is within the range of 0.50 to 0.60 and the ratio of $R_3$ to $R_4$ is within the range of 0.60 and 0.80, wherein $R_1$ designates the distance from the center of said square surface to the points on said inwardly directed lobes nearest the center, $R_2$ designates one half the width of the cooking surface, $R_3$ designates the distance from the center of said square surface to the points on said outwardly directed lobes most remote from the center, and $R_4$ designates the distance from the center to one corner of said cooking surface.

3. A cooking device comprising a plane heating surface of generally square configuration, an electric heating element in the form of a single turn loop secured in intimate heat exchange relationship with said surface, said loop comprising a plurality of outwardly directed curved lobes one extending toward each corner of said heating surface, adjacent ones of said outwardly directed lobes being interconnected by inwardly directed lobes, said loop being symmetrically disposed with respect to the center of said heating surface, the ratio of the distance between the center of said surface and the closest portion of said heating element to the distance between the center and the edge of said surface being within the range of 0.50 to 0.60, and the ratio of the distance between the center of said heating surface and the most remote point on one of said outwardly directed lobes to the distance between said center and one corner of said heating surface being within the range of 0.60 and 0.80.

References Cited by the Examiner

UNITED STATES PATENTS

| 1,127,373 | 2/15 | Read | 219—540 |
| 2,744,995 | 5/56 | Jepson | 219—441 |
| 2,914,650 | 11/59 | Sheahan | 219—436 |
| 2,926,230 | 2/60 | Foster | 219—435 X |
| 2,927,189 | 3/60 | Purpura | 219—436 X |

FOREIGN PATENTS 204,091  9/56  Australia.

RICHARD M. WOOD, *Primary Examiner.*